W. A. AND M. F. GRAM.
EXPANSIBLE CORE FOR VULCANIZING TIRES.
APPLICATION FILED NOV. 21, 1921.

1,406,640. Patented Feb. 14, 1922.

INVENTORS.
W. A. Gram
M. F. Gram
BY J. Edward Maybee
ATTY

UNITED STATES PATENT OFFICE.

WILLIAM A. GRAM AND MARTIN F. GRAM, OF WELLAND, ONTARIO, CANADA.

EXPANSIBLE CORE FOR VULCANIZING TIRES.

1,406,640. Specification of Letters Patent. Patented Feb. 14, 1922.

Application filed November 21, 1921. Serial No. 516,627.

*To all whom it may concern:*

Be it known that we, WILLIAM A. GRAM and MARTIN F. GRAM, of the town of Welland, in the county of Welland, Province of Ontario, Canada, subjects of the King of Great Britain, have invented certain new and useful Improvements in Expansible Cores for Vulcanizing Tires, of which the following is a specification.

This invention relates to means for applying pressure within a tire casing to force it firmly against the wall of a vulcanizing mold during the process of vulcanization. It is common to employ air bags for this purpose, but these are subject to rapid deterioration and are unreliable as they may unexpectedly collapse when in use. It has also been proposed to employ cores of resilient material, such as rubber, and collapsible cores of rigid materials, but such cores have usually been ineffective either because they did not possess the elastic and conformable qualities of the air bag or else did not possess or retain the collapsible qualities necessary to enable the device to be readily placed in position or removed. Our object therefore is to devise a core which will possess in as large a measure as possible the desirable qualities of an air bag and which, in addition, will have longer life and which will be absolutely reliable.

We attain our object by means of the construction described and illustrated in the accompanying drawings in which—

Figure 1:
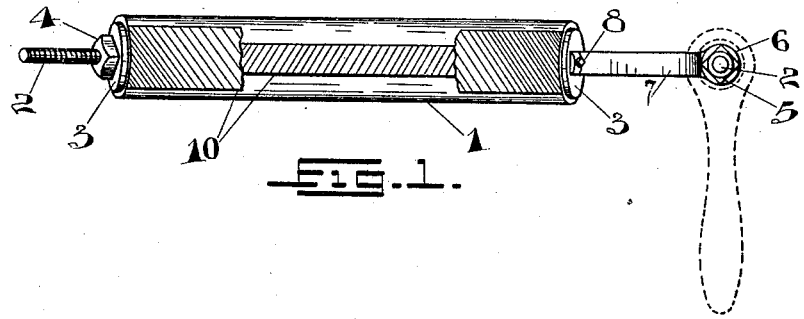
Figure 3:
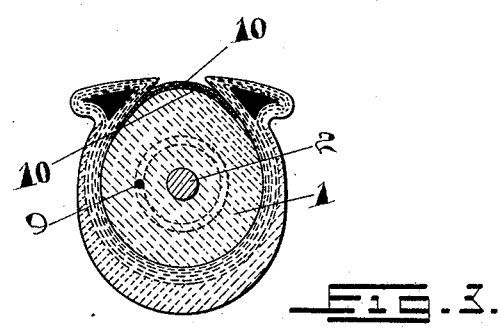
Figure 2:
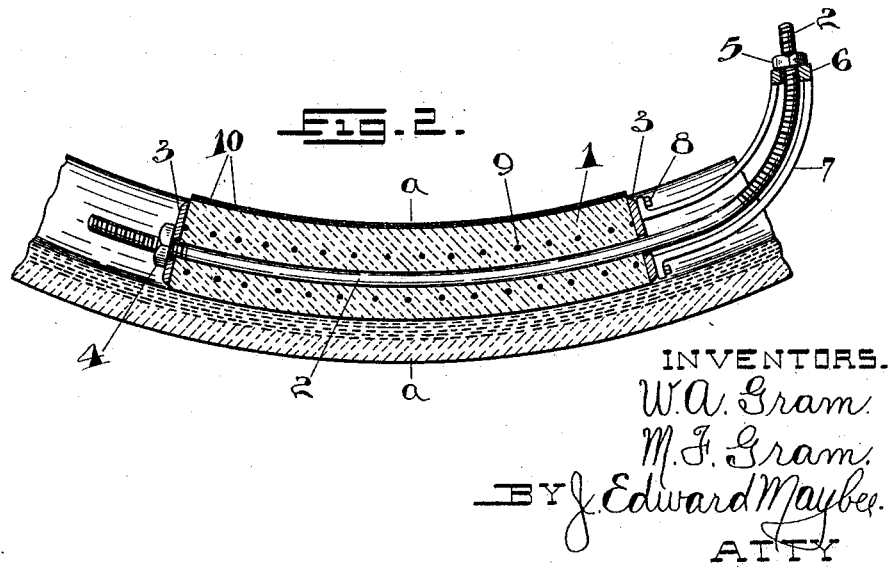

Fig. 1 is a plan view of the core;

Fig. 2 a longitudinal section showing the device in position in a tire casing; and Fig. 3 a cross section on the line *a—a* of Fig. 2 on an enlarged scale.

In the drawings like numerals of reference indicate corresponding parts in the different figures.

1 is a mass of soft elastic rubber or any suitable rubber substitute, which is shaped externally as a segment of the hollow interior of a tire casing. Axially of this mass is formed a hole for the passage of a rod 2. To each end of the mass is applied a clamping head 3. Through one of these heads the rod loosely passes, while the other is anchored to the rod in any suitable manner, the preferred manner being to thread the end of the rod and screw a nut 4 thereon. The other end of the rod 2 is curved laterally and is threaded to receive a nut 5. This nut is adapted to bear against the end 6 of an abutment member 7 adapted to engage the adjacent clamping head 3, through which the rod freely passes. The end 6 is preferably formed as a disk having an aperture therein, through which the rod 2 passes, while the abutment member 7 is preferably formed of curved members concentric substantially with the curved end of the rod and secured to the clamping head 3 by means of bolts and nuts 8.

It is evident that by adjusting the nut 5 that the mass 1 may be compressed between the clamping heads 3 and its diameter thus increased. The advantage of laterally curving the rod and arranging the abutment member, as shown, is that the nut 5 is brought to a position exterior of the tire casing in which it is easily reached for adjustment, for example, by a ratchet wrench, as indicated in dotted lines in Fig. 1.

While it is an easy matter to compress the mass of material 1, it is difficult to ensure its return to its original form when the pressure of the clamping heads is released. This is particularly the case after the device has been in use for some time. We overcome this trouble by molding in the mass 1 a coil spring 9, which extends longitudinally of the mass and surrounds the rod 2. This spring not only assists in returning the mass to its original condition in which it is easily inserted in the tire casing previous to the latter being placed in the vulcanized mold, but also tends to ensure that the transverse expansion of the mass is substantially equal at all parts of its length. To prevent wear and pinching of the exterior of the mass where it lies against the edges of the tire casing we vulcanize to the rim side of the mass two plies 10 of bias cut fabric. This fabric will strengthen the mass, but does not interfere in any way with its expansion and contraction.

From the above description, it will be seen that we have devised an expansion core which will satisfactorily attain the object of our invention as set out in the preamble to this specification.

What we claim as our invention is:—

1. An expansible core for vulcanizing tires comprising a mass of resilient rubber; clamping heads applied to the ends of said core; a rod extended axially through said mass, secured at one end to one of said heads and passing freely through the other or movable head, its free end being curved laterally out of alinement with the axis of the core and having a screw thread formed thereon; an abutment member through which the curved end passes and which engages the movable clamping head; and a nut threaded on the said end engaging the abutment member.

2. An expansible core for vulcanizing tires comprising a mass of resilient material; a coil spring molded in the mass and extending longitudinally about the axis of the core; a rod extending axially through the mass within the coil spring; clamping heads engaging the ends of the mass and connected with the rod; and means for adjusting one of said heads relative to the rod to compress the core.

3. An expansible core for vulcanizing tires comprising a mass of resilient material; a coil spring molded in the mass and extending longitudinally about the axis of the core; a rod extending axially through the mass within the coil spring; clamping heads engaging the ends of the mass and connected with the rod; means for adjusting one of said heads relative to the rod to compress the core; and a covering of elastic fabric secured to the side of the core which lies adjacent the rim side of a tire casing in which the device is employed.

4. An expansible core for vulcanizing tires comprising a mass of resilient rubber; clamping heads applied to the ends of said core; a rod extended axially through said mass, secured at one end to one of said heads and passing freely through the other or movable head, its free end being curved laterally out of alinement with the axis of the core and having a screw thread formed thereon; an abutment member through which the curved end passes and which engages the movable clamping head; a nut threaded on the said end engaging the abutment member; and a coil spring molded in the rubber mass and extending longitudinally about the axis of the core.

Signed at Welland this 3rd day of March 1921.

WILLIAM A. GRAM.
MARTIN F. GRAM.

Witnesses:
L. B. COLEMAN,
M. CONIAM.